(12) United States Patent
Ferlitsch (10) Patent No.: US 7,331,052 B2
(45) Date of Patent: Feb. 12, 2008

(54) SYSTEMS AND METHODS FOR PROVIDING A UNIVERSAL PRINT ASSIST

(75) Inventor: Andrew Rodney Ferlitsch, Tigard, OR (US)

(73) Assignee: Sharp Laboratories of America, Inc., Camus, WA (US)

( * ) Notice: Subject to any disclaimer, the term of this patent is extended or adjusted under 35 U.S.C. 154(b) by 914 days.

(21) Appl. No.: 10/271,870

(22) Filed: Oct. 15, 2002

(65) Prior Publication Data

US 2004/0070785 A1    Apr. 15, 2004

(51) Int. Cl.
*G06F 9/44*    (2006.01)
*G06F 15/00*   (2006.01)

(52) U.S. Cl. ..................... 719/331; 358/1.18
(58) Field of Classification Search .............. 358/1.15, 358/1.18; 717/120–122, 162–167; 719/328–332
See application file for complete search history.

(56) References Cited

U.S. PATENT DOCUMENTS

| 5,528,734 | A | * | 6/1996 | Sanchez ..................... 358/1.16 |
| 5,699,495 | A | * | 12/1997 | Snipp ......................... 358/1.15 |
| 5,742,828 | A | * | 4/1998 | Canady et al. ............... 717/144 |
| 5,938,766 | A | * | 8/1999 | Anderson et al. ........... 713/100 |
| 6,003,095 | A | * | 12/1999 | Pekowski et al. ........... 717/163 |
| RE37,258 | E |   | 7/2001 | Patel et al. ................. 358/1.15 |
| 6,266,693 | B1 |   | 7/2001 | Onaga ......................... 709/219 |
| 6,498,656 | B1 |   | 12/2002 | Mastie et al. .............. 358/1.15 |
| 7,055,146 | B1 | * | 5/2006 | Durr et al. ................... 717/162 |
| 2002/0063880 | A1 |   | 5/2002 | Raney ........................ 358/1.14 |
| 2002/0116439 | A1 |   | 8/2002 | Someshwar et al. ........ 709/104 |
| 2003/0035122 | A1 |   | 2/2003 | Amarger et al. ............. 358/1.1 |
| 2003/0184782 | A1 |   | 10/2003 | Perkins et al. ............. 358/1.13 |

FOREIGN PATENT DOCUMENTS

EP    0 917 042    5/1999
EP    0 738 949    2/2002

* cited by examiner

*Primary Examiner*—William Thomson
*Assistant Examiner*—Charles E Anya
(74) *Attorney, Agent, or Firm*—Michael F. Krieger; Kirton & McConkie (57) ABSTRACT

Systems and methods for providing a universal print assist in a printer environment. A print assist is provided as a separate component from a print processor and spooler to enable a selective intercept and performance of an action (e.g., to modify, split, merge, redirect, gather or register information or otherwise alter or make observation of a print data stream) on the print data stream as the data stream is despooled by the spooler or print processor to a print provider without customizing any pre-existing components. The print assist uses a method whereby the print assist is bound to the output interface between the spooler and/or print processor and the print provider. Accordingly, the despooled print data stream passes through the print assist as it is despooled from the spooler or the print processor to the print provider. And, since the print assist is a separate component, the print assist may be used with any customized print processor and/or spooler to provide a universal print assist solution.

23 Claims, 8 Drawing Sheets

SYSTEMS AND METHODS FOR PROVIDING A UNIVERSAL PRINT ASSIST

BACKGROUND OF THE INVENTION

1. Field of the Invention

The present invention relates to providing a universal print assist in a printer environment. More particularly, the present invention relates to systems and methods for intercepting and performing an action on a print data stream as it is despooled by a spooler or print processor to a print provider without customizing any pre-existing components.

2. Background and Related Art

In current printing environments, techniques exist that utilize a process of intercepting and performing an action on a print data stream in a spooler and/or print processor. For example, a product currently available to consumers splits up and modifies an existing print stream between two or more printers for parallel printing. The product is implemented as a driver independent solution and can be used with a high number of existing printer drivers. Driver independence may be achieved by replacing the print processor associated with the printer driver with a customized print processor. Accordingly, all actions are performed by the customized print processor, including obtaining options from a user or intercepting, modifying and redirecting the print data stream.

In the Microsoft® Windows family of operating systems, a print job is typically spooled to a spooler, which then despools the print job to a print processor that is associated with the printer driver that created the print job. A default print processor performs a limited number of actions but varies across operating system platforms.

The above-referenced product, which splits up and modifies an existing print stream between two or more printers for parallel printing, is an enhanced version of the default print processor that conforms to and performs all actions of the default print processor, in addition to its own actions, to seamlessly integrate with existing printer drivers by changing the association (i.e., configuration) of the print processor with the printer driver from the default print processor to the print processor of the product. However, this technique is not universal in its application.

Techniques also exist that replace a spooler and/or print processor with an enhanced version of the spooler and/or print processor, to solve such problems as: 1) distributed despooling; 2) load balancing; 3) print job accounting; and 4) print job error recovery. While these techniques have a wide use, they are not universal in their application either. For example, the technique cannot be used if the spooler and/or print processor cannot be replaced with an enhanced version. Therefore, when a printer driver includes its own customized print processor that performs customized actions in conjunction with the printer driver, a replacement print processor would not know of the custom print processor. Thus, for example, while color ink jet drivers commonly defer rasterization (i.e., generation of the printer swath) to a custom print processor, a custom print processor that universally performs rasterization is not currently available since rasterization is specific to each printer model.

Therefore, while techniques currently exist that utilize a process of intercepting and performing an action on a print data stream in a spooler and/or print processor, challenges still exist, including that the techniques are not universal in their application. Accordingly, it would be an improvement in the art to augment or even replace current techniques with other techniques.

SUMMARY OF THE INVENTION

The present invention relates to providing a universal print assist in a printer environment. More particularly, the present invention relates to systems and methods for intercepting and performing an action on a print data stream as it is despooled by a spooler or print processor to a print provider without customizing any pre-existing components.

Implementation of the present invention takes place in association with a computer device that is used in association with a printer environment. A print data stream is intercepted and an action (e.g., to modify, split, merge, redirect, gather or register information or otherwise alter or make observation of the print data stream) may be selectively performed thereon after the print data is despooled by a spooler or print processor to a respective print provider, without the use of an enhanced spooler or custom print processor.

In at least one implementation, a print assist is provided as a separate component from the print processor and spooler. The print assist uses a method whereby the print assist is bound (i.e., link edited) to the output interface between the spooler and/or print processor and the print provider (i.e., OpenPrinter(), WritePrinter(), ClosePrinter(), etc.). Accordingly, the despooled print data stream passes through the print assist as it is despooled from the spooler or the print processor to the print provider. And, since the print assist is a separate component, the print assist may be used with any customized print processor and/or spooler, thereby providing a universal print assist solution.

While the methods and processes of the present invention have proven to be particularly useful in a printer environment that includes a locally connected printer, those skilled in the art will appreciate that the methods and processes can be used in a variety of different applications and in a variety of different system configurations, including networked and/or wireless configurations to provide a universal print assist in a printer environment.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter. dr

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

The present invention relates to providing a universal print assist in a printer environment. More particularly, the present invention relates to systems and methods for intercepting and performing an action on a print data stream as it is despooled by a spooler or print processor to a print provider without customizing any pre-existing components.

In the disclosure and in the claims the term "print assist" shall refer to the process of intercepting and performing an action on a print data stream as it is despooled. Examples of intercepting and performing an action include modifying, splitting, merging, redirecting, gathering or registering information, or otherwise altering or making an observation of the print data stream.

Embodiments of the present invention take place in association with a computer device that is used in association with a printer environment that includes one or more local, remote, and/or network printers. In some embodiments, a print data stream is intercepted and an action may be selectively performed thereon after the print data is despooled by a spooler or print processor to a respective print provider, without the use of an enhanced spooler or custom print processor.

In some embodiments, the print assist is a separate component from the print processor and spooler, and it employs a method whereby the print assist is bound (i.e., link edited) to the output interface between the spooler and/or print processor and the print provider (i.e., OpenPrinter(), WritePrinter(), ClosePrinter(), etc.). Accordingly, the despooled print data stream passes through the print assist as it is despooled from the spooler or the print processor to the print provider. And, since the print assist is a separate component, the print assist may be used with any customized print processor and/or spooler to provide a universal print assist solution.

The following disclosure of the present invention is grouped into two subheadings, namely "Exemplary Operating Environment" and "Providing a Universal Print Assist." The utilization of the subheadings is for convenience of the reader only and is not to be construed as limiting in any sense.

Exemplary Operating Environment

As provided above, embodiments of the present invention take place in association with a computer device that is used in association with a printer environment that includes one or more local, remote, and/or network printers. Accordingly, FIG. 1 and the corresponding discussion are intended to provide a general description of a suitable operating environment in which the invention may be implemented. One skilled in the art will appreciate that the invention may be practiced by one or more computing devices and in a variety of system configurations, including in a networked configuration.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

Figure 1:
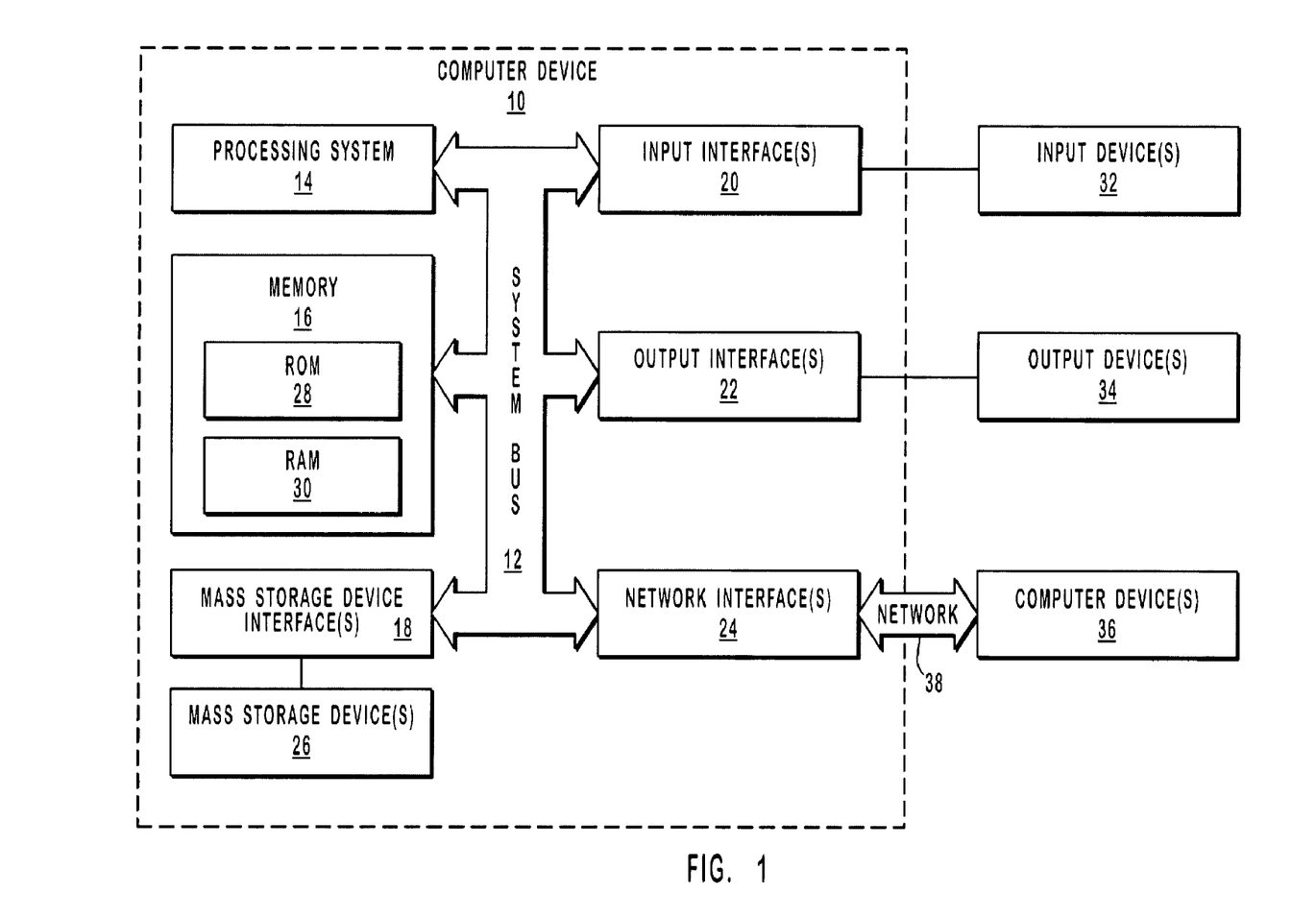
FIG. 1 illustrates a representative system that provides a suitable operating environment for use of the present invention.

With reference to FIG. 1, a representative system for implementing the invention includes computer device 10, which may be a general-purpose or special-purpose computer. For example, computer device 10 may be a personal computer, a notebook computer, a personal digital assistant ("PDA") or other hand-held device, a workstation, a minicomputer, a mainframe, a supercomputer, a multi-processor system, a network computer, a processorbased consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), a firewire (IEEE 1394), or another interface.

One or more output interfaces 22 may be employed to connect one or more corresponding output devices 34 to system bus 12. Examples of output devices include a monitor or display screen, a speaker, a printer, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Figure 2:
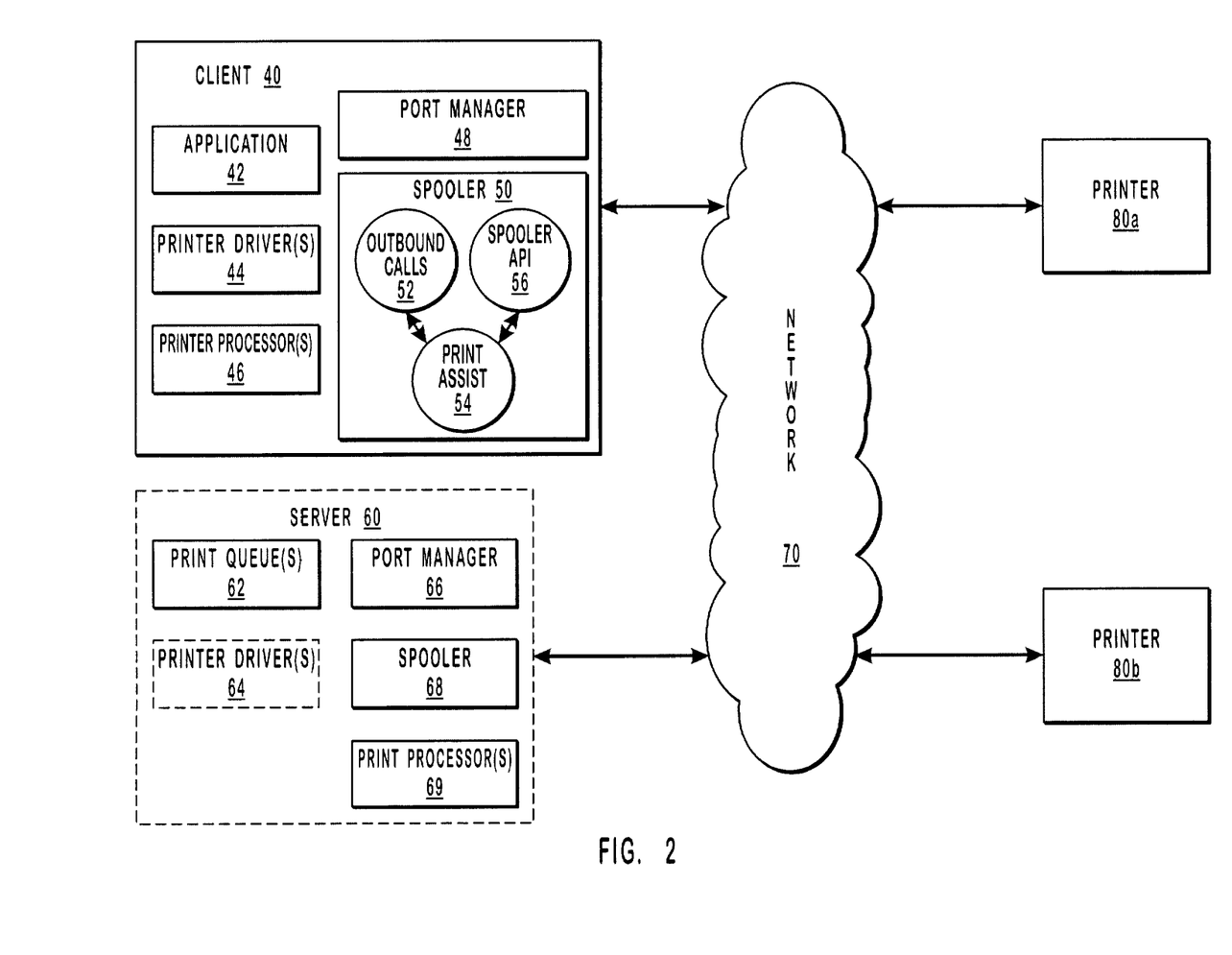
FIG. 2 illustrates a representative system configuration that may be used in association with the present invention.

While those skilled in the art will appreciate that embodiments of the present invention may be practiced in a variety of different environments with many types of computer system configurations, FIG. 2 represents a representative networked system configuration that may be used in association with the present invention. While FIG. 2 illustrates an embodiment that includes a client, two printers, and optionally a print server connected to a network, alternative embodiments include more than one client, only one printer, more than two printers, no server, and/or more than one server connected to a network, and one or more computer devices connected locally, peer-peer, or via a network to one or more printing devices. Moreover, embodiments in accordance with the present invention also include wireless networked environments, or where the network is a wide area network, such as the Internet.

The representative system of FIG. 2 includes a computer device, illustrated as client 40, which is connected to a plurality of printing devices 80 across network 70. While printers 80 are connected to network 76, embodiments of the present invention embrace the use of one or more printing devices that are locally connected to a computer, that are configured in a peer-to-peer printing environment, or network connected (i.e. via print server) or that are configured in a wireless network environment. Further, the printing devices may be one or more multi-function printers (MFPS). In another embodiment, the printing device is connected to a RIP server.

In the illustrated embodiment, client 40 includes a software application 42, one or more print drivers 44, one or more print processors 46, a port manager 48, and a spooler 50. In accordance with the illustrated embodiment, a spooler, such as spooler 50, includes outbound calls 52, print assist 54, and spooler application program interface ("API") 56. In one embodiment, unbound calls to the spooler APIs in the on-disk copy of the print processor DLL are relinked to a substitution library during a relinking process. In another embodiment, bound calls to the spooler APIs in the on-disk copy of the spooler are relinked to a substitution library during a relinking process. Both such embodiments will be further discussed below. In another embodiment, a printer server 60 is included having one or more print queues 62, one or more printer drivers 64, a port manager 66, a spooler 68, and one or more print processors 69. In such an embodiment, spooler 68 may alternatively include a print assist that interfaces between outbound calls and a spooler API.

In accordance with the present invention, a user initiates a print job, typically from a software application 42 or by an automated or background process. Upon initiating a print job, the user selects a command or a sequence of commands that indicates the user's intent to despool the print data to one or more printing devices. As will be discussed below, embodiments of the present invention embrace providing a universal print assist, where the print assist is a separate component from the print processor and spooler and uses a method whereby the print assist is bound (i.e., link edited) to the output interface between the spooler and/or print processor and print provider (i.e., OpenPrinter(), WritePrinter(), ClosePrinter(), etc.). The despooled print data stream passes through the print assist as it is despooled from the spooler to the print processor or print provider, or print processor to the print provider. And, since the print assist is a separate component, it can be used with any customized print processor and/or spooler to provide a universal print assist solution.

Providing a Universal Print Assist

As indicated above, embodiments of the present invention relate to systems and methods for intercepting and performing an action on a print data stream as it is despooled by a spooler or print processor to a print provider without customizing any pre-existing components.

In a first embodiment, a print processor is loaded into the spooler's address space and the print processor's spooler APIs are link-edited at run-time. Thus, for example, unbound calls to a spooler API in an on-disk copy of a print processor DLL are relinked to a substitution library during a relinking process. Each replaced spooler API call has a corresponding entry in the substitution library that matches the respective call's calling and argument convention. The replacement library performs the print assist action on the print data stream, or other passed data, and then invokes the corresponding spooler API passing through the unmodified and modified data according to the calling and argument convention of the respective spooler API.

In a second embodiment, the spooler's call references to the spooler API are link-edited at compile time. The bound calls to the spooler APIs in the on-disk copy of the spooler are relinked to a substitution library during a relinking process. Each replaced spooler API call includes a corresponding entry in the substitution library that matches the respective call's calling and argument convention. The replacement library performs the print assist action on the print data stream, or other passed data, and then invokes the corresponding spooler API passing through the unmodified and modified data according to the calling and argument convention of the respective spooler API.

Figure 3:
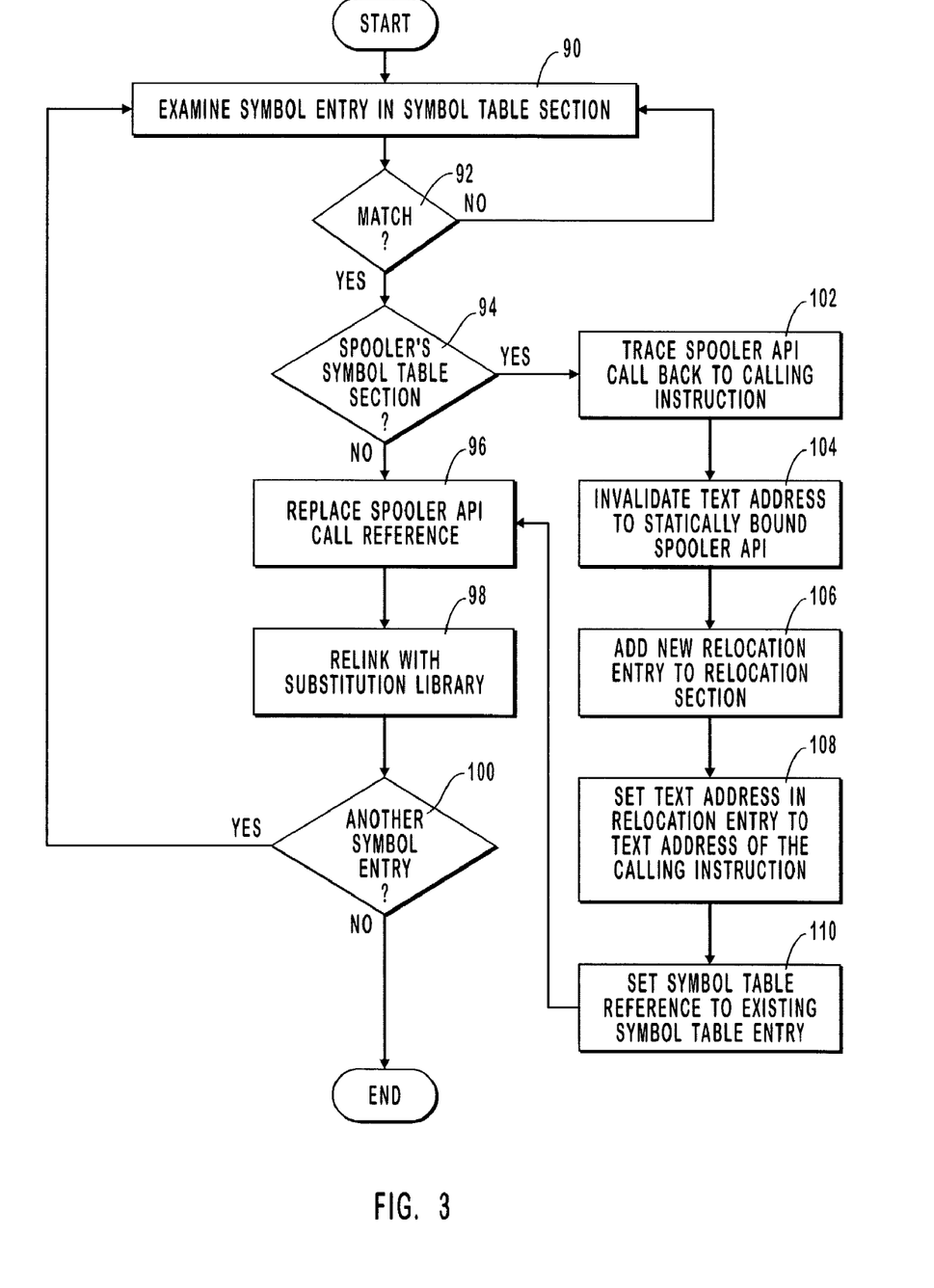
FIG. 3 illustrates a flow chart that provides a representative method for providing a universal print assist.

With reference now to FIG. 3, a flow chart is illustrated that provides a representative method for providing and using a universal print assist. In FIG. 3, execution begins at step 90 where a symbol entry in the symbol table section is examined. A decision is then made at decision block 192 as to whether or not a match occurs. If a match does not occur, execution returns back to step 90 for the examination of another symbol entry in the symbol table section. Alternatively, if it is determined at decision block 92 that a match has been identified, execution proceeds to decision block 94.

At decision block 94, a determination is made as to whether or not the symbol table section is a spooler's symbol table section. The determination that the symbol table section is not a spooler's symbol table section relates to the first embodiment referenced above, where a print processor is loaded into the spooler's address space and the print processor's spooler APIs are link-edited at run-time. Thus, if it is determined at decision block 94 that the symbol table section is not a spooler's symbol table section, execution proceeds to step 96 for the replacement of the spooler API call reference.

Figure 4A:
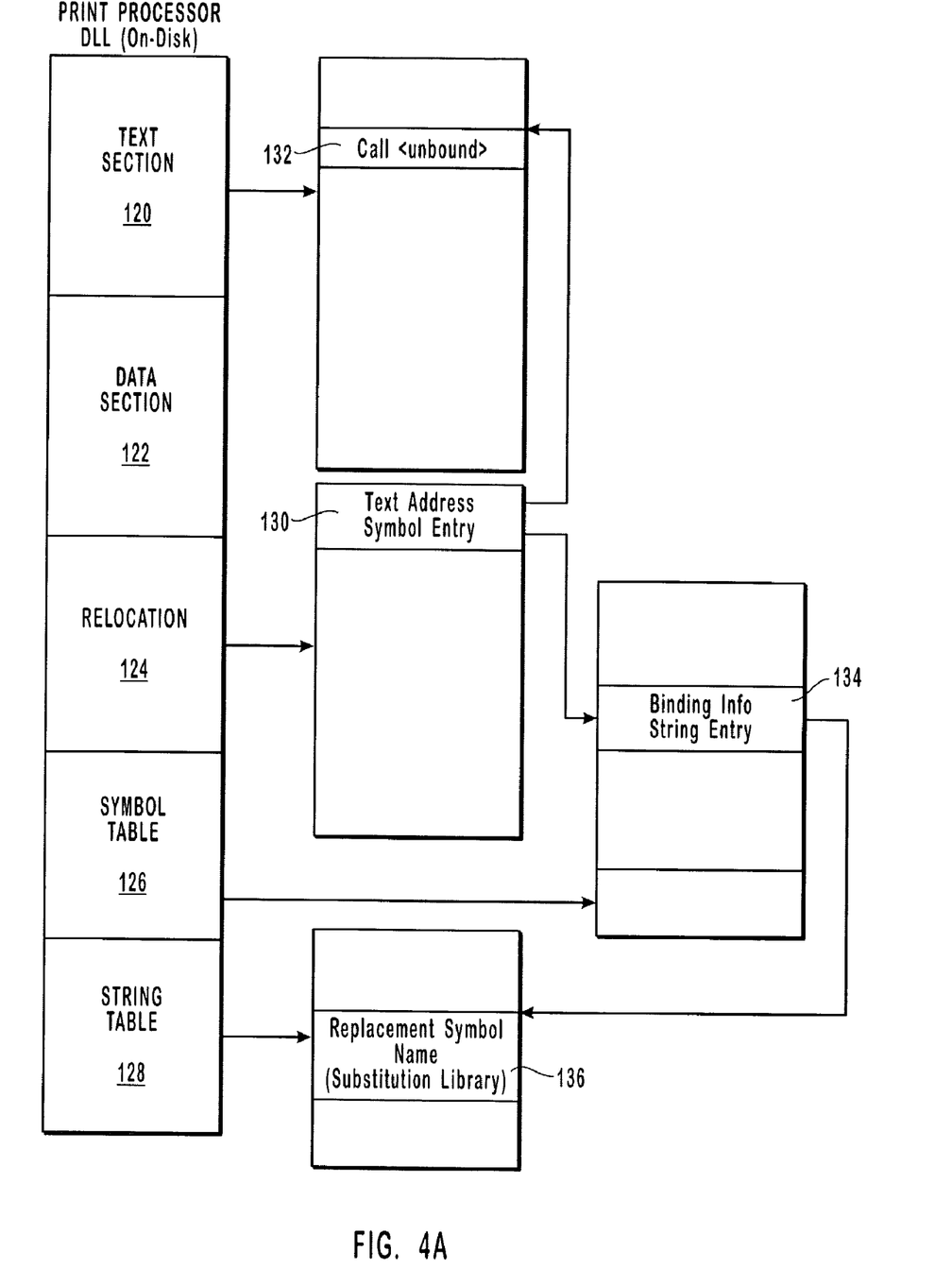
FIG. 4A illustrates an embodiment that includes processing relating to a print processor DLL for performing a step for replacing the spooler application program interface ("API") call reference as indicated in the flow chart of FIG. 3.
Figure 4B:
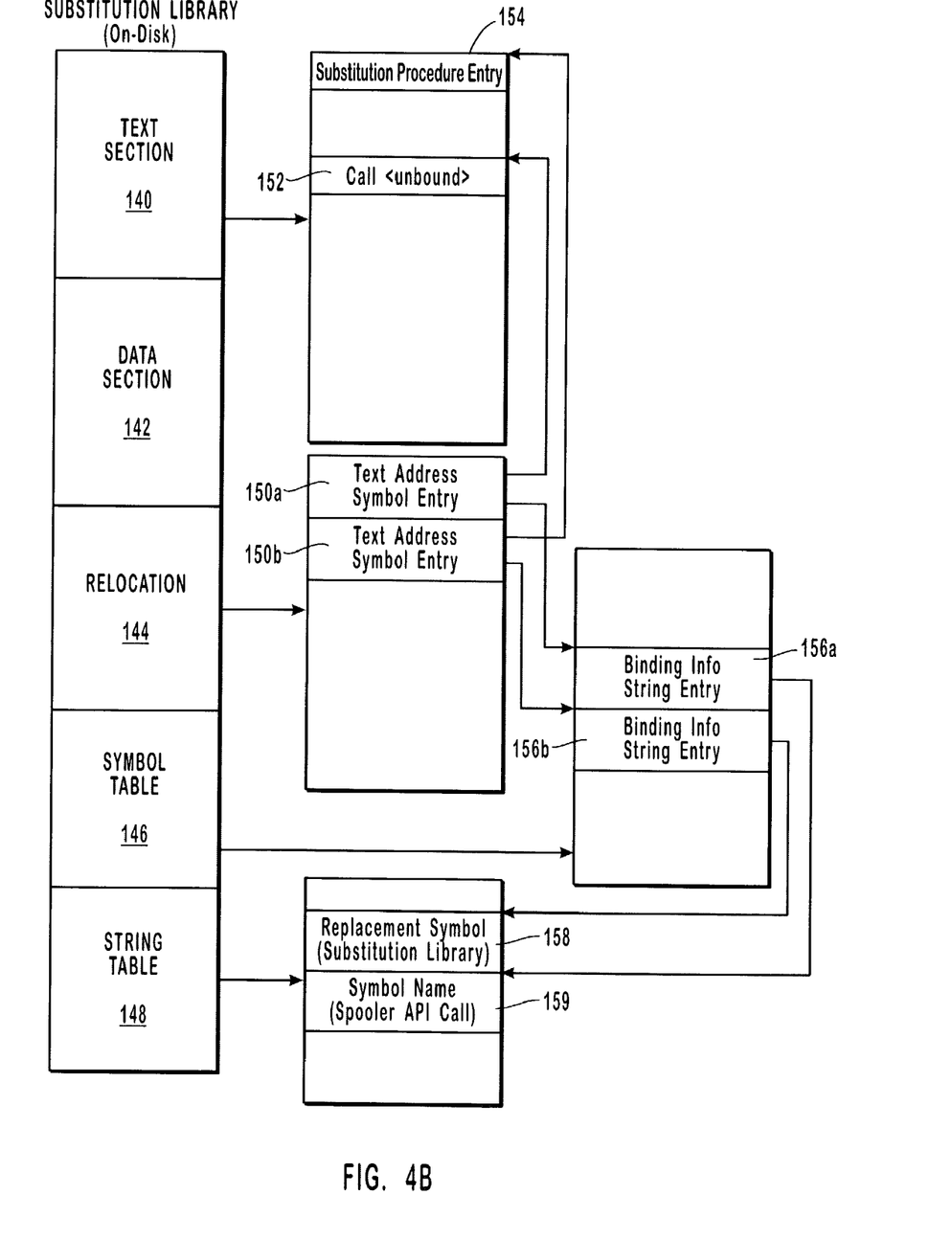
FIG. 4B illustrates an embodiment that includes processing relating to a substitution library for performing a step for replacing the spooler API call reference as indicated in the flow chart of FIG. 3.

The performance of step 96 is illustrated by FIGS. 4A-4B, wherein FIG. 4A illustrates an embodiment that includes processing relating to a print processor DLL for performing the step for replacing the spooler API call reference, and wherein FIG. 4B illustrates an embodiment that includes processing relating to a substitution library for performing the step for replacing the spooler API call reference.

In FIG. 4A, the print processor DLL includes text 120, data section 122, relocation section 124, symbol table section 126, and string table section 128. Text section 120 includes executable code to implement the procedures in DLL, where each procedure is defined by an entry point. Data section 122 is a non-local and non-heap memory (e.g., global, module scope, file scope, class scope, etc.) that persists while the DLL is loaded. In a further embodiment, at least some memory is pre-initialized or un-initialized. Relocation section 124 includes information on unbound data and procedure calls. Each entry refers to a reference to a data or procedures call that is external to the DLL and cannot be resolved (i.e., bound) during compile time. An entry may include an address in the code section of the data/procedure reference and a pointer to an entry in a symbol table of data/procedure. reference. Symbol table section 126 includes storage and link editing information on data, procedures and procedure calls. Each entry refers to unique data, procedure or procedure call and includes, for example, binding information and a pointer to entry in a string table of data/procedure/call name. String table section 128 includes storage of read-only strings as data and string names of symbols. The later is used to identify symbols, references, and definitions in other object modules for link editing.

Relocation section 124 provides a text address symbol entry 130, which in combination with text section 120 provides an unbound call 132. Text address symbol entry 130 in combination with symbol table section 126 provide a binding information string entry 134, which in combination with string table section 128 provide a replacement symbol name 136 for the substitution library.

With reference to FIG. 4B, the substitution library also includes a text section (text section 140), a data section (data section 142), a relocation section (relocation section 144), a symbol table section (symbol table section 146), and a string table section (string table section 148). Relocation section 144 provides a text address symbol entries 150, wherein text address symbol entry 150*a* in combination with text section 140 provides substitution procedure entry 154, and wherein text address symbol entry 150*b* in combination with text section 140 provides an unbound call 152. Text address symbol entries in combination with symbol table section 146 provide binding information string entries 156, wherein binding information string entry 156*a* in combination with string table section 148 provides a replacement symbol 158 for the substitution library, and wherein binding information string entry 156*b* in combination with string table section 148 provides a symbol name 159 for the spooler API call.

Thus, the replacement is performed by examining each symbol entry in the print processor DLL's symbol table section (step 90 of FIG. 3) for references to the spooler API calls that are to be replaced. The spooler API calls are identified, for example, by following in each symbol table entry the pointer to the string table and matching the string to the link convention name of the spooler API call. For each match, the spooler API call reference is replaced (step 96 of FIG. 3 and as illustrated by FIGS. 4A-4B) by updating the sting table pointer in the corresponding symbol table entry to a new string table entry. The string table entry is the link convention of the substitution library replacement for the corresponding spooler API call.

Figure 4C:
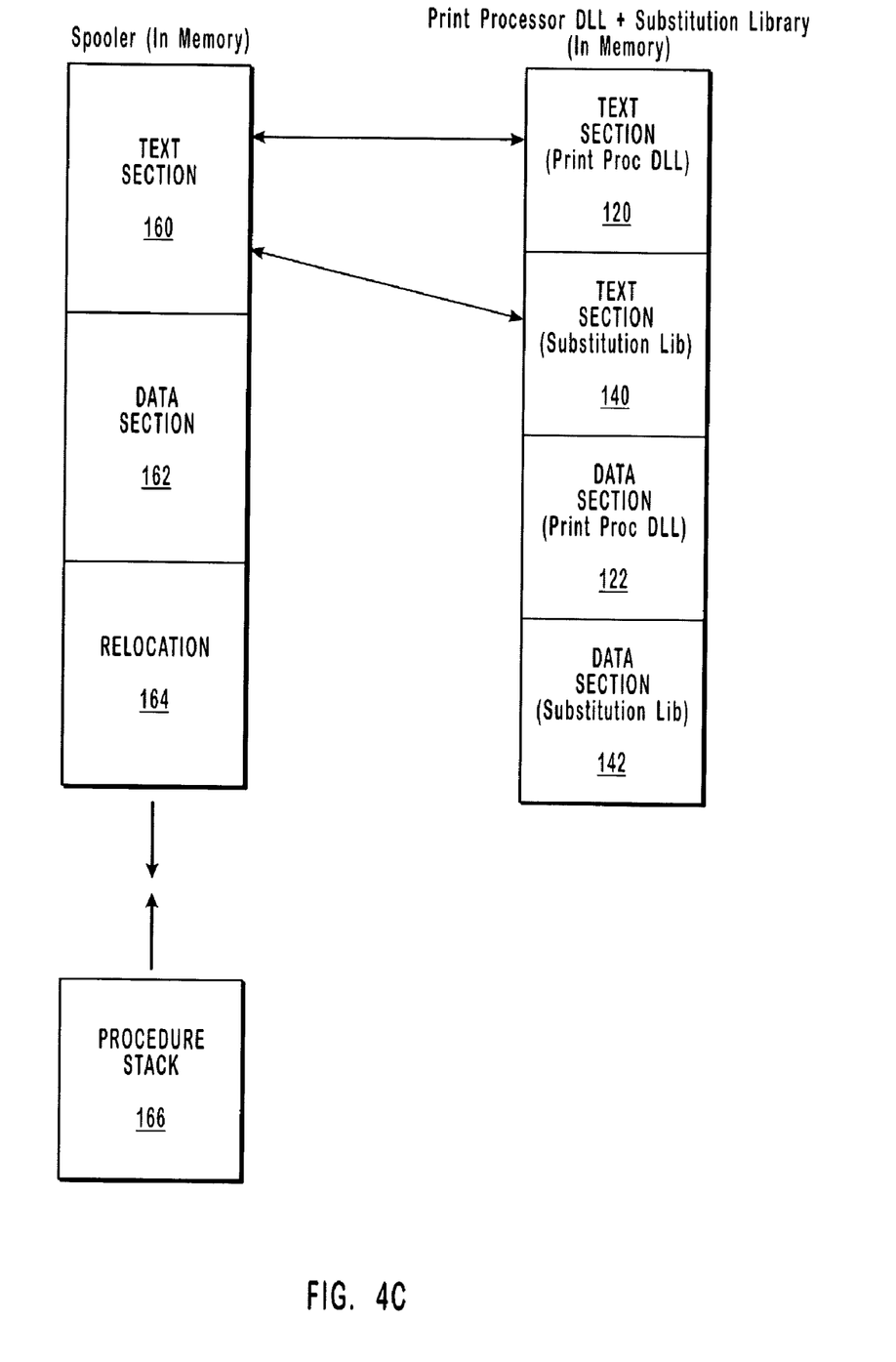
FIG. 4C illustrates an embodiment that includes processing relating to a step for relinking with the substitution library as indicated in the flow chart of FIG. 3.

With reference back to FIG. 3, once the spooler API call reference is replaced (step 96 of FIG. 3), execution proceeds to step 98 for a re-linking with the substitution library. FIG. 4C illustrates an embodiment that includes processing relating to the step for relinking with the substitution library. In FIG. 4C, the spooler includes a text section 160, a data section 162, and a relocation section 164, which interfaces with a procedure stack 166. The text section 160 interfaces with a text section 120 of the print processor DLL and a text section 140 of the substitution library. Thus, as illustrated in FIG. 4C, the print processor DLL is relinked with the substitution library. The text and data sections of the substitution library are merged into the text and data sections of the print processor DLL. The linker examines all relocation entries for data/call references that can be bound. Since the replacement references are defined in the substitution library, the linker completes the binding from the print processor DLL to the substitution library.

With reference back to FIG. 3, once the relinking takes place with the substitution library at step 98, execution proceeds to decision block 100 for a determination as to whether or not another symbol entry exists. If it is determined at decision block 100 that another symbol entry exists, execution returns back to step 94 for the examination of the next symbol entry.

As indicated above, in a second embodiment the spooler's call references to the spooler API are link-edited at compile time. Thus, with reference back to decision block 94 of FIG. 3, if it is determined that the symbol table section is a spooler's symbol table section, execution proceeds to step 102 to trace the spooler API call back to the calling instruction and then to step 104 to invalidate the text address to a statically bound spooler API. At step 106, a new relocation entry is added to the relocation section and at step 108 the text address is set in the relocation entry to the text address of the calling instruction. At step 110 a symbol table reference is set to the existing symbol table entry. Execution then proceeds to step 96, where the spooler API call reference is replaced.

Figure 5A:
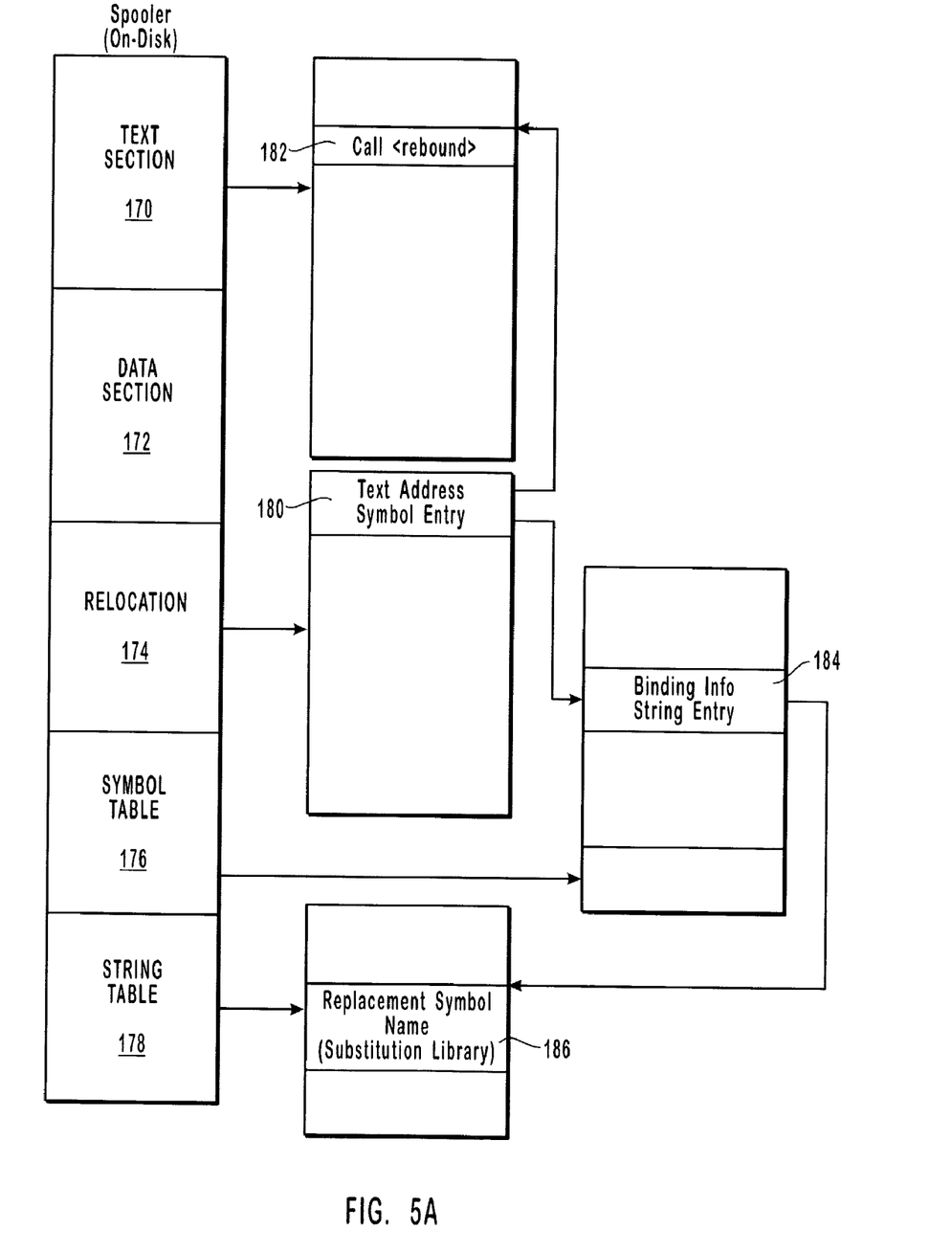
FIG. 5A illustrates an embodiment that includes processing to replace the spooler API call reference that occurs when the spooler's symbol table section is involved as indicated in the flow chart of FIG. 3.

To illustrate execution of steps 102-110 and step 96, reference is made to FIG. 5A. In FIG. 5A, the spooler includes a text section 170, a data section 172, a relocation section 174, a symbol table section 176, and a string table section 178. Text section 170 includes executable code (e.g., assembly instructions in binary format) that includes the procedures in the spooler and spooler API, where each procedure is defined by an entry point. Data section 172 includes non-local and non-heap memory (e.g., global, module scope, file scope, class scope) that persists while the spooler is loaded in process memory. In a further embodiment, some memory is pre-initialized or un-initialized. Relocation section 174 includes information on unbound data and procedure calls, where each entry refers to a reference to data or procure call that is external to the spooler and cannot be resolved (i.e., bound) during compile time. For example, each entry includes an address in a code section of data/procedure reference and a pointer to an entry in a symbol table of a data/procedure reference. Symbol table section 176 includes storage and link editing information on data and procedures and procedure calls, wherein each entry refers to a unique data, procedure, or procedure call. For example, each entry includes binding information and a pointer to an entry in the string table of the data/procedure/call name.

Thus, as illustrated in FIG. 5A, relocation section provides a text address symbol entry 180, which in combination with text section 170 provides a rebound call 182. Text address symbol entry 180 in combination with symbol table 176 provides a binding information string entry 184, which in combination with string table section 178 provides a replacement symbol name 186 for the substitution library.

Therefore, the replacement is performed by examining each symbol entry in the spooler's symbol table section for references to the spooler API calls that are to be replaced (step 90 of FIG. 3). The spooler API calls can be identified, for example, by following in each symbol table entry the pointer to the string table entry and matching the string to the link convention name of the spooler API call. For each match, the spooler API call reference is traced back to the calling instruction in the text section (step 102 of FIG. 3). The text address to the statically bound spooler API is invalidated (i.e. unbound) (step 104 of FIG. 3). A new relocation entry is added to the relocation section (step 106 of FIG. 3). The text address in the relocation entry is set to the text address of the calling instruction (step 108 of FIG. 3) and the symbol table reference is set to the existing symbol table entry (step 110 of FIG. 3). The spooler API call reference is replaced by updating the string table pointer in the corresponding symbol table entry to a new string table entry (step 96 of FIG. 3). The string table entry establishes the link to the substitution library replacement for the corresponding spooler API call.

With reference back to FIG. 3, once the spooler API call reference is replaced by updating the string table pointer in the corresponding symbol table entry to a new string table entry (step 96), execution proceeds to step 98 to relink with the substitution library. This is illustrated in FIG. 5B, in which the spooler includes text section 170, text section 190, data section 172, data section 192, and heap stack 194, which interfaces with procedure stack 196.

Figure 5B:
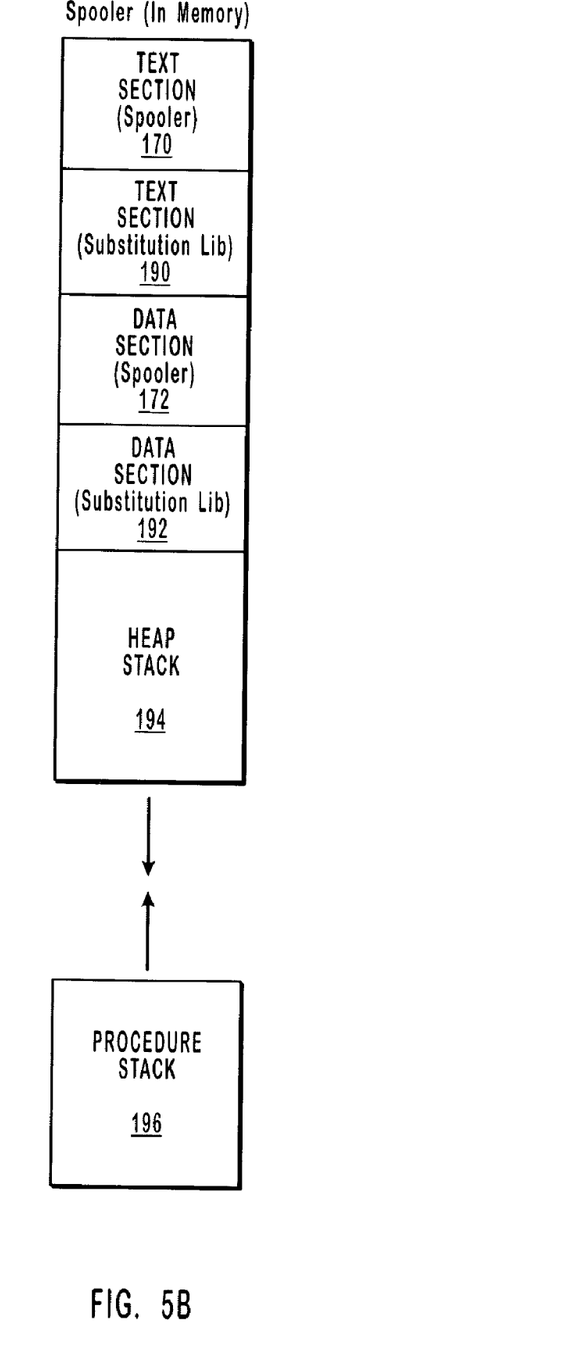
FIG. 5B illustrates an embodiment that includes processing relating to a step for relinking with the substitution library when the spooler's symbol table section is involved as indicated in the flow chart of FIG. 3.

Thus, as indicated in FIG. 5B, the spooler is relinked with the substitution library. The text and data sections of the substitution library are merged into the text and data sections of the spooler. The linker examines all relocation entries for data/call references that can now be rebound. Since the replacement references are defined in the substitution library, the linker completes the binding from the spooler to the substitution library.

With reference back to FIG. 3, once the relinking occurs at step 98, execution proceeds to decision block 100 for a determination as to whether or not another symbol entry exists. If it is determined at decision block 100 that another symbol entry exists, execution returns back to step 90.

While the methods and processes of the present invention have proven to be particularly useful in a Microsoft® Windows operating system environment, those skilled in the art will appreciate that the methods and processes can be used in a variety of different operating system environments, including in the spooling and despooling subsystems of the Apple Macintosh® operating system, Linux® operating system, System V Unix® operating systems, BSD Unix® operating systems, OSF Unix® operating systems, IBM® Mainframe MVS operating systems, etc.

Thus, as discussed herein, the embodiments of the present invention embrace providing a universal print assist in a printer environment. More particularly, the present invention relates to systems and methods for intercepting and performing an action on a print data stream as it is despooled by a spooler or print processor to a print provider without customizing any pre-existing components.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a printing system that includes a computer device, a method for providing a universal print assist, the method comprising the steps for:

loading a print processor into an address space of a spooler;

link-editing an application program interface of the print processor at run-time, comprising the step for relinking an unbound call to the application program interface in a dynamic link library of the print processor to a substitution library;

providing a print data stream;

despooling the print data stream to a print provider, wherein the despooling is performed by one of:
(i) the spooler; and
(ii) the print processor;

intercepting the despooled print data stream; and performing an action on the despooled print data stream, wherein the steps for intercepting the print data stream and performing an action on the print data stream are performed by a print assist that is a separate component from the spooler and the print processor.

2. A method as recited in claim 1, wherein the steps for intercepting the print data stream and performing an action on the print data stream are performed without the use of at least one of:
(i) an enhanced spooler; and
(ii) a customized print processor.

3. A method as recited in claim 1, wherein the step for intercepting the print data stream includes the step for passing the despooled print data stream through the print assist as it is despooled to the print provider.

4. A method as recited in claim 1, wherein the step for performing an action on the print data stream comprises one of:
(i) modifying the print data stream as it is despooled from the print processor;
(ii) splitting the print data stream as it is despooled from the print processor;
(iii) merging the print data stream as it is despooled from the print processor;
(iv) redirecting at least a portion of the print data stream as it is despooled from the print processor;
(v) gathering information relating to the print data stream as it is despooled from the print processor;
(vi) registering information from print data stream as it is despooled from the print processor;
(vii) altering the print data stream as it is despooled from the print processor; and
(viii) making an observation relating to the print data stream as it is despooled from the print processor.

5. A method as recited in claim 1, further providing the step for providing a corresponding entry in the substitution library for a call of the application program interface, wherein the corresponding entry matches the call's calling and argument convention.

6. A method as recited in claim 5, wherein the substitution library performs the step for performing an action on the despooled print data stream, and wherein the substitution library invokes the call of the one of the application program interfaces.

7. A method as recited in claim 1, wherein the step for link-editing one or more application program interfaces of the print processor at run-time comprises the steps for:
examining a symbol entry in a dynamic link library's symbol table section of the print processor for a reference to an application program interface call that is to be replaced; and
replacing the reference.

8. A method as recited in claim 7, wherein the step for examining each symbol entry comprises the step for following a pointer in the symbol table entry to a string table and matching a string to a link convention name of the application program interface call, and wherein the step for replacing a reference of the application program interface call comprises the step for updating the pointer to a new string table entry.

9. A computer program product for implementing within a printing system a method for providing a universal print assist, the computer program product comprising:
a computer readable medium for providing computer program code means utilized to implement the method, wherein the computer program code means is comprised of executable code for implementing the steps for:
loading a print processor into an address space of a spooler;
link-editing an application program interface of the print processor at run-time comprising the step for relinking an unbound call to the application program interface in a dynamic link library of the print processor to a substitution library;
providing a print data stream;
despooling the print data stream to a print provider, wherein the despooling is performed by one of:
(i) the spooler; and
(ii) the print processor;
intercepting the despooled print data stream; and
performing an action on the despooled print data stream, wherein the steps for intercepting the print data stream and performing an action on the print data stream are performed by a print assist that is a separate component from the spooler and the print processor.

10. A computer program product as recited in claim 9, wherein the computer program code means is comprised of executable code for further implementing the step for providing a corresponding entry in the substitution library for a call of the application program interface, wherein the corresponding entry matches the call's calling and argument convention.

11. A computer program product as recited in claim 9, wherein the step for link-editing one or more application program interfaces of the print processor at run-time comprises the steps for:
examining a symbol entry in a dynamic link library's symbol table section of the print processor for a reference to an application program interface call that is to be replaced; and
replacing the reference.

12. A computer program product as recited in claim 11, wherein the step for examining each symbol entry comprises the step for following a pointer in the symbol table entry to a string table and matching a string to a link convention name of the application program interface call, and wherein the step for replacing a reference of the application program interface call comprises the step for updating the pointer to a new string table entry.

13. In a printing system that includes a computer device, a method for providing a universal print assist, the method comprising the steps for:
link-editing a spooler call reference to an application program interface at compile time;
providing a print data stream;
despooling the print data stream to a print provider, wherein the despooling is performed by one of:
(i) a spooler; and
(ii) a print processor;

intercepting the despooled print data stream; and performing an action on the despooled print data stream, wherein the steps for intercepting the print data stream and performing an action on the print data stream are performed by a print assist that is a separate component from the spooler and the print processor.

14. A method as recited in claim 13, wherein the step for link-editing a spooler call reference to an application program interface at compile time comprises the step for relinking a bound call of the application program interfaces to a substitution library.

15. A method as recited in claim 14, further comprising the step for providing a corresponding entry in the substitution library for the bound call, wherein the corresponding entry matches the bound call's calling and argument convention.

16. A method as recited in claim 15, wherein the substitution library performs the step for performing an action on the despooled print data stream, and wherein the substitution library invokes the call of the application program interface.

17. A method as recited in claim 16, wherein the step for link-editing a spooler call reference to an application program interface at compile time comprises the steps for:
    examining a symbol entry in a spooler's symbol table section for a reference to the application program interface call that is to be replaced;
    tracing the reference to a calling instruction in a text section;
    invalidating a text address to a statically bound spooler application program interface;
    adding a relocation entry in a relocation section;
    setting a text address in the relocation entry to the invalidated text address;
    setting the reference to an existing symbol table entry;
    replacing the application program interface call reference by updating a string table pointer in the symbol table entry to a new string table entry; and
    re-linking the spooler with the substitution library.

18. A method as recited in claim 17, wherein the step for examining a symbol entry comprises the step for identifying the application program interface call that is to be replaced by following a pointer in the symbol table entry to a string table entry and matching a string to a link convention name of the application program interface call.

19. A computer program product for implementing within a printing system a method for providing a universal print assist, the computer program product comprising:
    a computer readable medium for providing computer program code means utilized to implement the method, wherein the computer program code means is comprised of executable code for implementing the steps for:
        link-editing a spooler call reference to an application program interface at compile time;
        providing a print data stream;
        despooling the print data stream to a print provider, wherein the despooling is performed by one of:
            (i) a spooler; and
            (ii) a print processor;
        intercepting the despooled print data stream; and
        performing an action on the despooled print data stream, wherein the steps for intercepting the print data stream and performing an action on the print data stream are performed by a print assist that is a separate component from the spooler and the print processor.

20. A computer program product as recited in claim 19, wherein the step for link-editing a spooler call reference to an application program interface at compile time comprises the step for relinking a bound call of the application program interfaces to a substitution library.

21. A computer program product as recited in claim 20, wherein the computer program code means is comprised of executable code for further implementing the step for providing a corresponding entry in the substitution library for the bound call, wherein the corresponding entry matches the bound call's calling and argument convention.

22. A computer program product as recited in claim 21, wherein the step for link-editing a spooler call reference to an application program interface at compile time comprises the steps for:
    examining a symbol entry in a spooler's symbol table section for a reference to the application program interface call that is to be replaced;
    tracing the reference to a calling instruction in a text section;
    invalidating a text address to a statically bound spooler application program interface;
    adding a relocation entry in a relocation section;
    setting a text address in the relocation entry to the invalidated text address;
    setting the reference to an existing symbol table entry;
    replacing the application program interface call reference by updating a string table pointer in the symbol table entry to a new string table entry; and
    re-linking the spooler with the substitution library.

23. A computer program product as recited in claim 22, wherein the step for examining a symbol entry comprises the step for identifying the application program interface call that is to be replaced by following a pointer in the symbol table entry to a string table entry and matching a string to a link convention name of the application program interface call.

* * * * *